(12) United States Patent
Peel et al.

(10) Patent No.: US 10,849,321 B2
(45) Date of Patent: Dec. 1, 2020

(54) PORTABLE GROUND BLIND STAND WITH CASE

(71) Applicant: Tactacam LLC, Caledonia, MN (US)

(72) Inventors: Jeff Peel, Decorah, IA (US); Garrison Peel, Caledonia, MN (US)

(73) Assignee: TACTACAM LLC, Caledonia, MN (US)

( * ) Notice: Subject to any disclaimer, the term of this patent is extended or adjusted under 35 U.S.C. 154(b) by 0 days.

(21) Appl. No.: 16/298,710

(22) Filed: Mar. 11, 2019

(65) Prior Publication Data

US 2019/0274298 A1    Sep. 12, 2019

Related U.S. Application Data

(60) Provisional application No. 62/641,356, filed on Mar. 11, 2018.

(51) Int. Cl.
| | | |
|---|---|---|
| *A01M 31/02* | (2006.01) | |
| *E04H 3/28* | (2006.01) | |
| *E04H 15/56* | (2006.01) | |
| *E04H 15/00* | (2006.01) | |

(52) U.S. Cl.
CPC .......... *A01M 31/025* (2013.01); *A01M 31/02* (2013.01); *E04H 3/28* (2013.01); *E04H 15/001* (2013.01); *E04H 15/56* (2013.01); *Y10S 135/901* (2013.01)

(58) Field of Classification Search
CPC ... E04H 15/001; E04H 15/56; Y10S 135/901; A01M 31/025; A01M 31/02
USPC ...... 135/116, 118, 120.1, 901; 182/116, 222; 206/548, 577, 579; 190/11, 12 R
See application file for complete search history.

(56) References Cited

U.S. PATENT DOCUMENTS

| | | | | |
|---|---|---|---|---|
| 155,235 A | * | 9/1874 | Goldsmith | E04H 15/62 135/118 |
| 672,725 A | * | 4/1901 | Wickersham | B65D 9/34 217/5 |
| 1,646,922 A | * | 10/1927 | MacKinnon | A47B 3/087 190/12 R |
| 1,812,196 A | * | 6/1931 | Brown | A47B 3/0912 108/35 |
| 1,850,636 A | * | 3/1932 | Schauer | A47B 3/10 190/12 R |

(Continued)

FOREIGN PATENT DOCUMENTS

| | | | | | |
|---|---|---|---|---|---|
| CA | 2973252 A1 | * | 1/2018 | .......... | A01M 31/002 |
| GB | 269425 A | * | 4/1927 | ............... | A47B 3/10 |

*Primary Examiner* — Robert Canfield
(74) *Attorney, Agent, or Firm* — McAndrews, Held & Malloy, Ltd.

(57) ABSTRACT

Systems, apparatuses, and methods are described which provide a portable ground blind stand. The portable ground blind stand can be used with a blind for hunting and/or observing, for example. The portable ground blind stand includes, for example, a case and a stand platform. The case is configured to carry other components of the portable ground blind stand when the portable ground blind is being stored or carried and is configured as a floor or floor covering attached to a stand platform when the portable ground blind is assembled. The portable ground blind stand can be stored in the case and is light enough to be carried by hand by a single person. The portable ground blind stand can be assembled without tools in some instances in a few minutes.

20 Claims, 15 Drawing Sheets

(56) References Cited

U.S. PATENT DOCUMENTS

| | | | | |
|---|---|---|---|---|
| 1,910,704 A * | 5/1933 | MacDonald | A47B 3/14 | |
| | | | 297/139 | |
| 1,918,241 A * | 7/1933 | Bellavia | A45C 9/00 | |
| | | | 190/2 | |
| 1,920,577 A * | 8/1933 | Malinowski | A47B 3/0912 | |
| | | | 108/35 | |
| 2,309,484 A * | 1/1943 | Van Meter | E06C 7/46 | |
| | | | 182/109 | |
| 3,220,766 A * | 11/1965 | Kates | A01M 31/025 | |
| | | | 297/184.16 | |
| 3,289,787 A * | 12/1966 | McSwain | E04H 15/001 | |
| | | | 182/20 | |
| 3,480,023 A * | 11/1969 | McConnell | E04H 15/62 | |
| | | | 135/125 | |
| 4,034,518 A * | 7/1977 | Trecker | A45C 9/00 | |
| | | | 5/114 | |
| 4,295,481 A * | 10/1981 | Gee | E04H 15/62 | |
| | | | 135/95 | |
| 4,471,793 A * | 9/1984 | Cattaneo | B60P 3/38 | |
| | | | 135/88.16 | |
| 4,927,128 A * | 5/1990 | O'Brian | A47B 3/087 | |
| | | | 108/36 | |
| 5,029,671 A * | 7/1991 | Larson | B60S 5/00 | |
| | | | 182/131 | |
| 5,154,255 A * | 10/1992 | Kiska | E06C 7/46 | |
| | | | 182/111 | |
| 5,535,683 A * | 7/1996 | Novak | A45C 9/00 | |
| | | | 108/11 | |
| 5,954,156 A * | 9/1999 | Cooke | B25H 1/06 | |
| | | | 182/153 | |
| 6,119,812 A * | 9/2000 | Chin | A01M 31/02 | |
| | | | 182/223 | |
| 6,192,909 B1 * | 2/2001 | Strausser | E04H 15/40 | |
| | | | 135/116 | |
| 6,892,860 B2 * | 5/2005 | Gibson | E04G 1/28 | |
| | | | 108/119 | |
| 8,220,197 B1 * | 7/2012 | Pray | A01M 1/106 | |
| | | | 135/159 | |
| 8,671,963 B2 * | 3/2014 | Shih | E04H 15/60 | |
| | | | 135/137 | |
| 8,789,548 B2 * | 7/2014 | Atherton | E04H 15/001 | |
| | | | 135/121 | |
| D783,742 S * | 4/2017 | Adema | D21/699 | |
| 10,035,255 B2 * | 7/2018 | Cindric | E06C 1/18 | |
| 2007/0215011 A1 * | 9/2007 | Khan | A45C 9/00 | |
| | | | 108/11 | |
| 2010/0229905 A1 * | 9/2010 | Lin | E04H 15/48 | |
| | | | 135/96 | |
| 2020/0154877 A1 * | 5/2020 | Hurley | A47B 3/10 | |

* cited by examiner

PORTABLE GROUND BLIND STAND WITH CASE

RELATED APPLICATIONS/INCORPORATED BY REFERENCE

The present application claims benefit from and priority to U.S. Application No. 62/641,356, filed Mar. 11, 2018. The above-identified application is hereby incorporated herein by reference in its entirety.

BACKGROUND

Conventional tree stands used in hunting or observing wildlife can be uncomfortable and can suffer from safety concerns and a lack of portability.

Further limitations and disadvantages of conventional and traditional approaches will become apparent to one of skill in the art, through comparison of such systems with the present disclosure as set forth in the remainder of the present application with reference to the drawings.

BRIEF SUMMARY

Systems and methods for providing portable ground blind stands substantially as illustrated by and/or described in connection with at least one of the figures, as set forth more completely in the claims.

Various advantages, aspects and novel features of the present disclosure, as well as details of an illustrated embodiment thereof, will be more fully understood from the following description and drawings.

DETAILED DESCRIPTION

As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g." and "for example" set off lists of one or more non-limiting examples, instances, or illustrations.

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated.

Some embodiments according to the present disclosure relate to systems, apparatuses, and methods that provide portable blind stands, ground blind stands, and/or portable ground blind stands.

Some embodiments of the ground blind stand according to the present disclosure are more comfortable and portable than a tree blind and overcome many of the safety concerns of the tree blind. Some embodiments of the ground blind stand according to the present disclosure are lightweight and portable and provide an adjustable blind platform. Some embodiments of the ground blind stand according to the present disclosure enable the user to set up the blind off the ground and/or above the water line for a better view of the surroundings.

Some embodiments of the ground blind stand provide a portable and collapsible ground blind stand. Lightweight and foldable for easy carrying (e.g., carrying by a single person), the ground blind stand unpacks out of itself, thereby allowing a user (e.g., a hunter, an observer, etc.) to get elevated with any pop-up style ground blind without building a permanent, bulky wooden platform. Being made of aluminum (and/or other light-weight and sturdy materials such as composite materials) and a waterproof canvas, the ground blind stand is impervious to the external elements and can be left out all year long. The ground blind stand includes adjustable legs that enable the user to adjust the legs to the proper height suitable for the surroundings and to level the stand platform when on uneven ground. The ground blind stand is foldable and portable and uses its own foldable floor or floor cover as a case for compact storage and transportation. The waterproof design is configured to keep the user out of the mud and water and even can be floated into water-filled locations for duck blinds.

Figure 1:
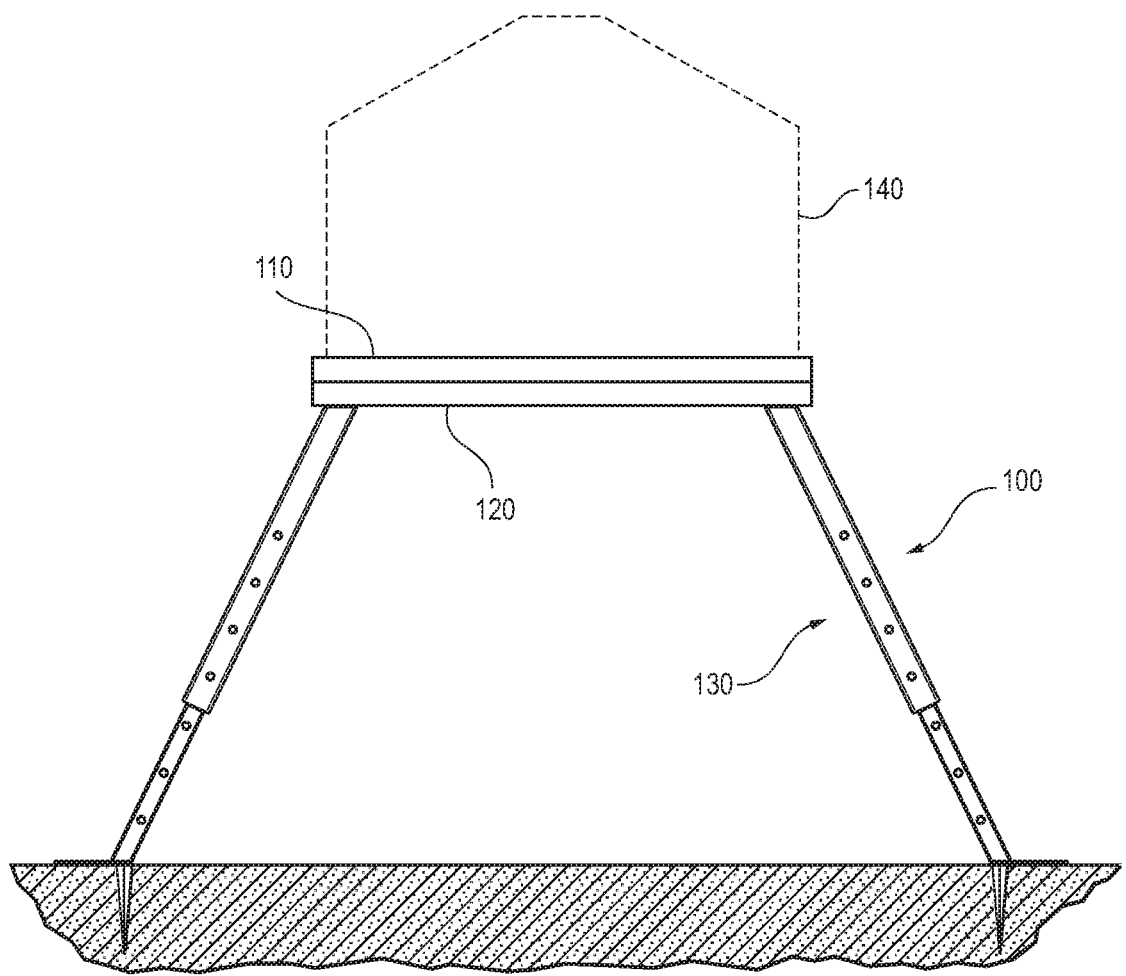
FIG. 1 shows an exemplary ground blind stand according to an embodiment of the present disclosure.

FIG. 1 shows an exemplary ground blind stand according to an embodiment of the present disclosure. Referring to FIG. 1, the ground blind stand 100 includes, for example, a folding floor case 110 that is configured as a floor and/or floor cover and is disposed on top of a blind base 120. Blind legs 130 support the blind base and the folding floor case 110. An exemplary ground blind 140, shown in dashed lines, is secured onto the ground blind stand. The ground blind stand is made of light-weight and sturdy materials that make the ground blind stand easily portable and, in particular, easily portable in the folding floor case.

Figure 2:
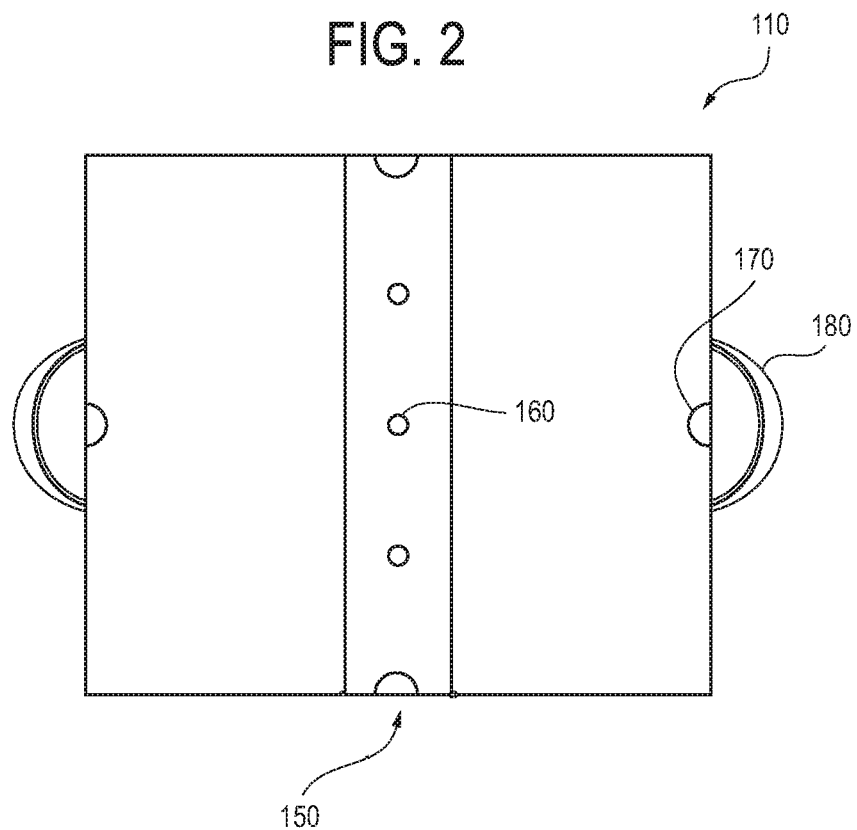
FIG. 2 shows a top view of an exemplary folding floor case according to an embodiment of the present disclosure.
Figure 6:
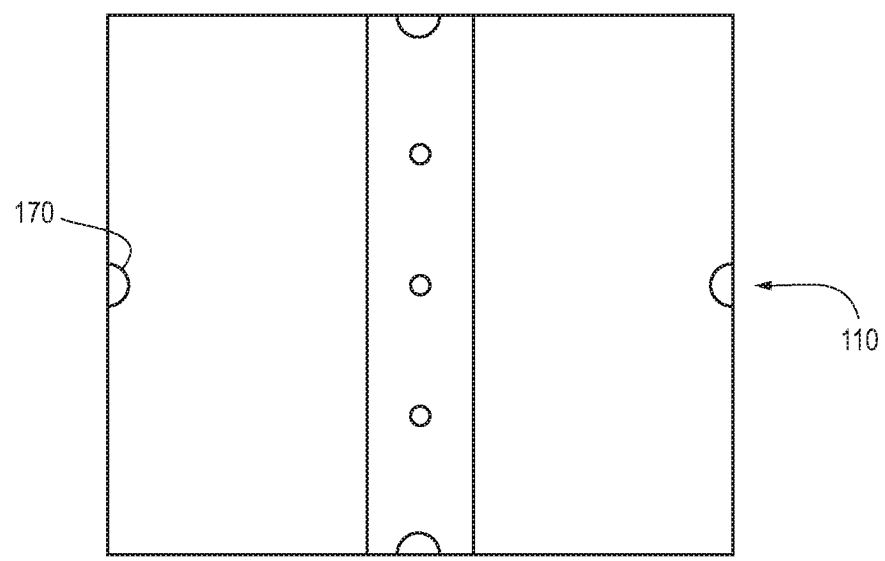
FIG. 6 shows an exemplary folding floor case according to an embodiment of the present disclosure.

FIG. 2 shows a top view of an exemplary folding floor case according to the present disclosure. In some embodiments, the folding floor case 110 and/or the blind base 120 can be made of, for example, aluminum and/or composite material with aluminum ribbings for structural support. In some embodiments, the folding floor case 110 can be made of, for example, a waterproof rip stop nylon material, for example. Referring to FIG. 2, the folding floor case 110 includes, for example, two rectangular portions that are physically connected to a hinge 150 (e.g., thick center hinge) with drain holes 160 or other type of spaces. Each rectangular portion includes a U-shaped cutout 170 and a carrying strap 180. The folding floor case 110 includes a foldable, reinforced, and waterproof floor or cover that folds to become a case for the blind stand components to be stored and transported. The hinge 150 is wide enough to enable all of the ground blind stand components to be stored and/or folded within to create a secure carrying case. FIG. 6 shows an exemplary folding floor case according to the present disclosure. Referring to FIG. 6, the U-shaped cutouts 170 are configured to expose blind connectors for easier access and tie downs. For example, the U-shaped cutouts enable a blind to be connected to the blind security loops without the collapsible platform obstructing any cords. The straps (e.g., straps, Velcro, fasteners, snaps other attachment mechanisms) are used to secure the folding floor case, which is a floor, to the blind base. Further, drain holes are configured to enable water to escape, thereby keeping occupants of the ground blind dry.

Figure 3:
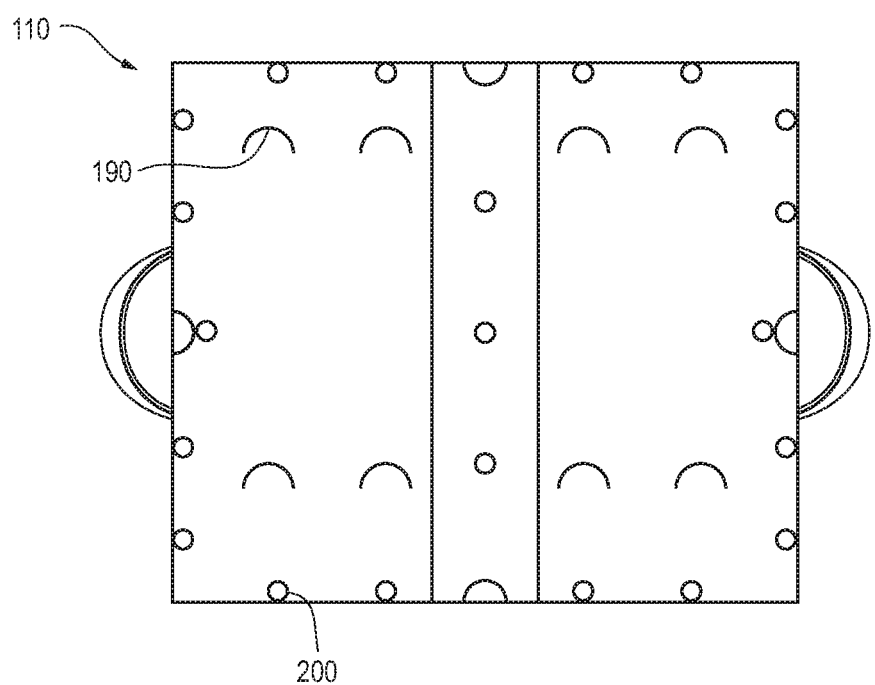
FIG. 3 shows a bottom view of an exemplary folding floor case according to an embodiment of the present disclosure.

FIG. 3 shows a bottom view of an exemplary folding floor case according to the present disclosure. Referring to FIG. 3, the folding floor case 110 includes, for example, component straps (e.g., four component straps per rectangular portion) and security straps 200 (e.g., eight security straps per rectangular portion). Security straps 200 are configured to connect the folding floor case 110 to the frame of the collapsible platform so that the folding floor case 110 does not slide relative to the frame of the collapsible platform. Traps and pockets on the bottom of the folding floor case also enable some ground blind stand components to be stored securely for transportation.

Figure 4:
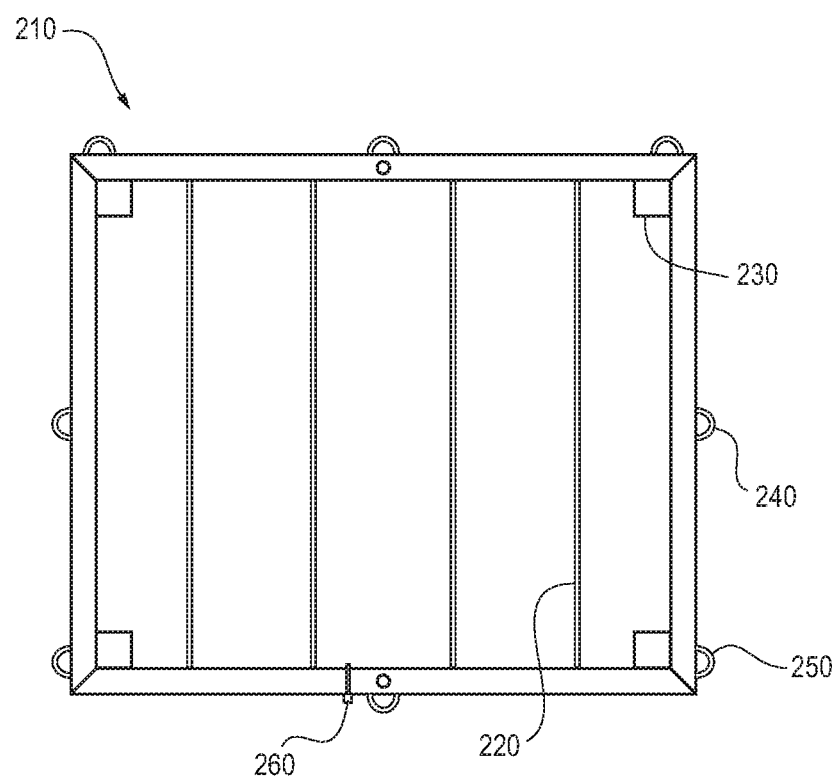
FIG. 4 shows an exemplary collapsible platform according to an embodiment of the present disclosure.

FIG. 4 shows an exemplary collapsible platform according to the present disclosure. Referring to FIG. 4, the collapsible platform 210 includes, for example, cross braces 220, leg attachments 230, blind security loops 240, ground anchor loops 250, and connection points 260. The collapsible platform 210 includes a multi-piece platform that is configured to lock together securely (e.g., without tools) in seconds to create the base 120 for attaching the legs 130 (e.g., the leg arrangement) and the floor (e.g., the folding floor case 110). The leg attachments 230 are configured to receive the leg arrangements 130, which can be removable, collapsible, and/or foldable. The loops 240 on the four sides of the collapsible platform 210 are used to secure the collapsible platform 210 to the ground. Straps, Velcro, fasteners, snaps other attachment mechanisms are used to secure the collapsible platform 210 to the foldable floor case 110, which acts as a floor or cover for the ground blind stand, to prevent the floor 110 from sliding relative to the collapsible platform 210. The blind security loops 240 are configured to connect the ground blind cords to the frame (e.g., made of aluminum and/or other light-weight, sturdy materials and/or composites) of the collapsible platform 210, for example, to prevent the ground blind from blowing away. The ground anchor loop 250 is configured to connect the ground blind stand to the ground to keep it from blowing over in high winds. In some embodiments, the cross braces 220 are inserted into a frame of the collapsible platform to strengthen the collapsible platform. The cross braces 220 can be removed for easy storage, for example, in the foldable floor case 110. In some embodiments, the foldable floor case 110 has straps or pockets which to store the cross braces 220. Although removable in some embodiments, the cross braces can be fixed in or integral to the collapsible platform and still be within the scope of the present disclosure. The cross braces 220 can be positioned as shown in FIG. 4 and/or be perpendicular to the direction of the cross braces 220 shown in FIG. 4. In addition according to some embodiments, the cross braces 220 can coated with a sound-dampening strip so that during assembly into the collapsible platform 210 can be performed quietly without the clang of metal against metal.

Figure 5:
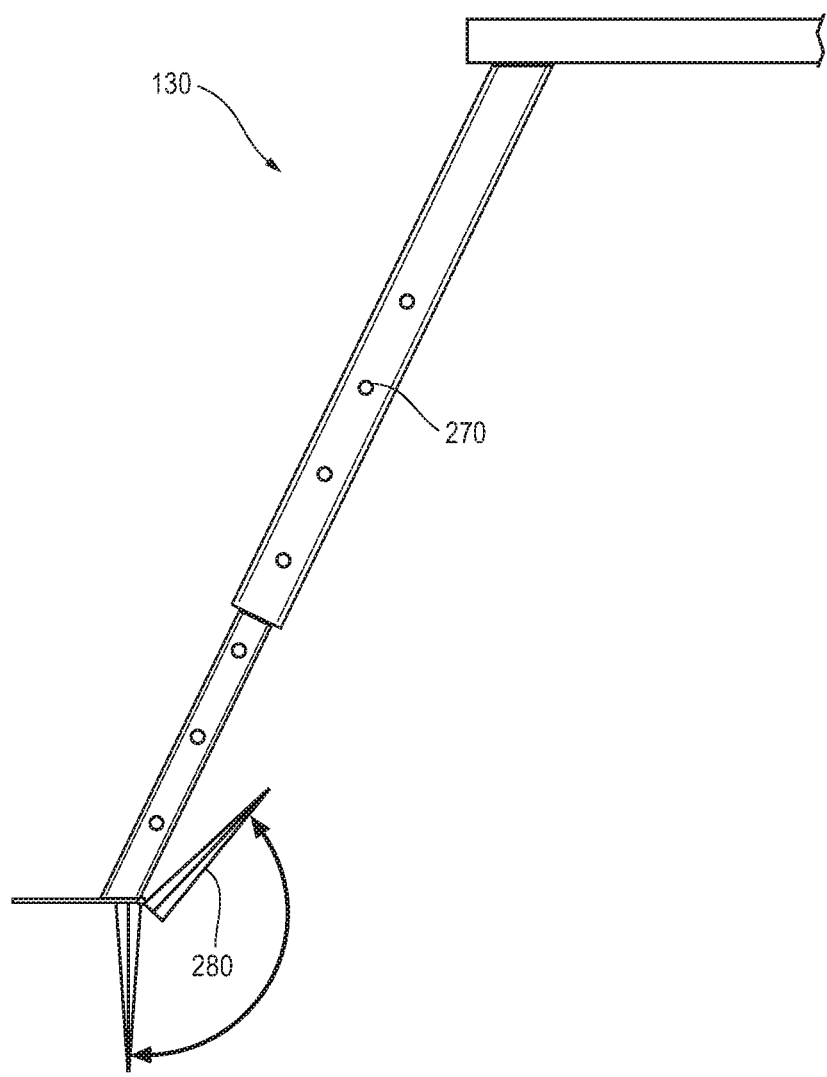
FIG. 5 shows an exemplary leg arrangement according to an embodiment of the present disclosure.
Figure 7:
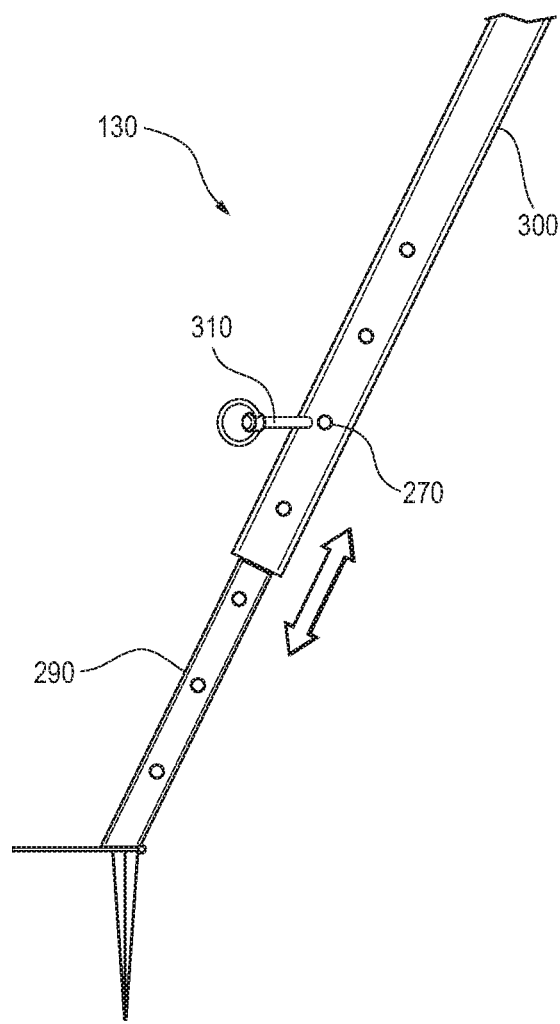
FIG. 7 shows an exemplary leg arrangement according to an embodiment of the present disclosure.

FIG. 5 shows an exemplary leg arrangement 130 according to the present disclosure. The leg arrangement 130 can be made of, for example, aluminum, steel, and/or a composite material. Referring to FIG. 5, the leg arrangement 130 includes, for example, adjustable legs 130 with adjustment or aligning holes 270. The leg arrangement 130 also includes a foldable and/or removable ground stake 280 to secure the leg to the ground. The foldable and/or removable ground stake can be used, for example, when the ground blind stand is set up on sloping ground. FIG. 7 shows an exemplary leg arrangement according to the present disclosure. Referring to FIG. 7, an inner leg 290 slides into an outer leg 300 to allow for multiple height and/or length adjustments and leveling on uneven ground. In some embodiments, a nylon sleeve is disposed between the inner leg 290 and the outer leg 300 to dampen sound as the length of the leg is adjusted or during assembly. Once leveled, a pin, a peg, or some other locking mechanism 310 slides through aligning or adjustment holes 270 to secure a desired height. The leg arrangement 130 slides and locks into the collapsible platform 210 at a particular angle for strength and stability. Further, the leg arrangements 130 can be removed from the collapsible platform 210 for easy storage within the folding floor case 110 (e.g., held in straps or pockets of the folding floor case 110).

Figure 8:
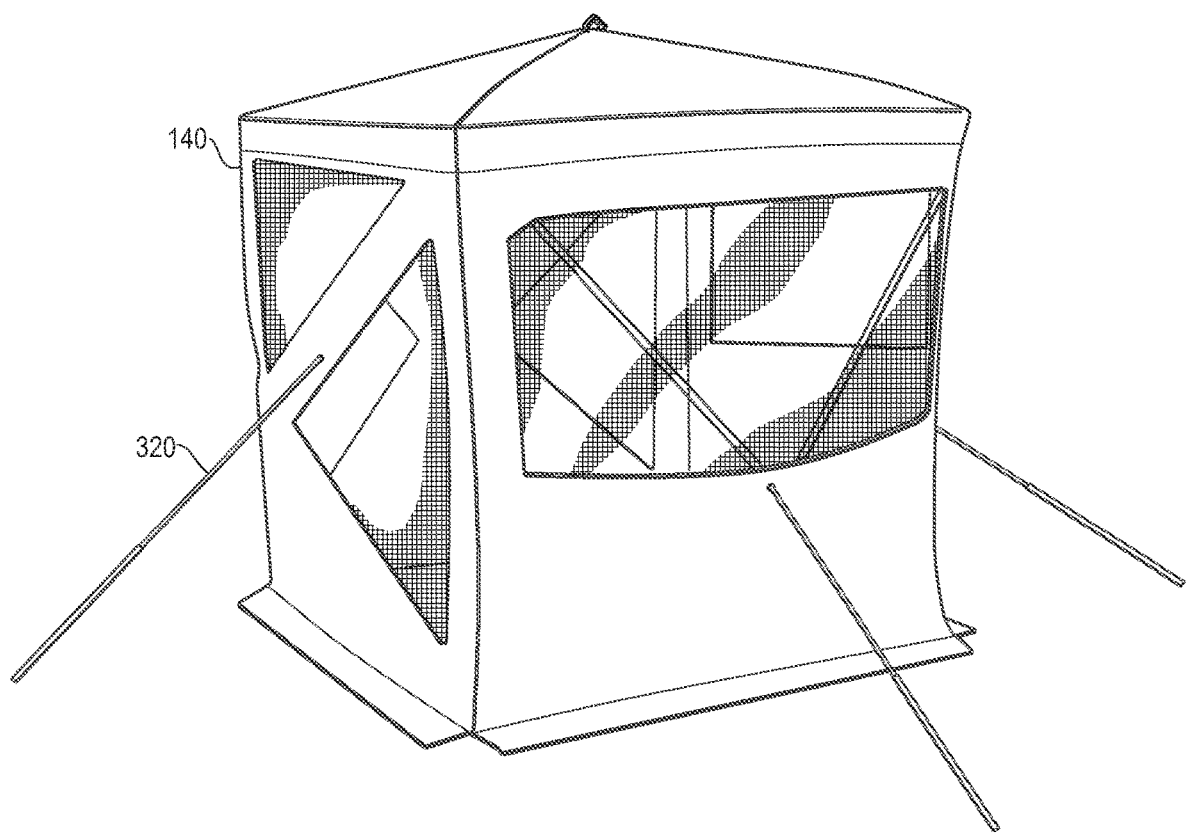
FIG. 8 shows an exemplary ground blind sitting atop and/or around an exemplary portable ground blind stand according to an embodiment of the present disclosure.

FIG. 8 shows an exemplary ground blind 140 sitting atop and/or around a portable ground blind stand 100 according to the present disclosure. The ground blind is secured with, among other things, tie-down straps 320.

Figure 11:
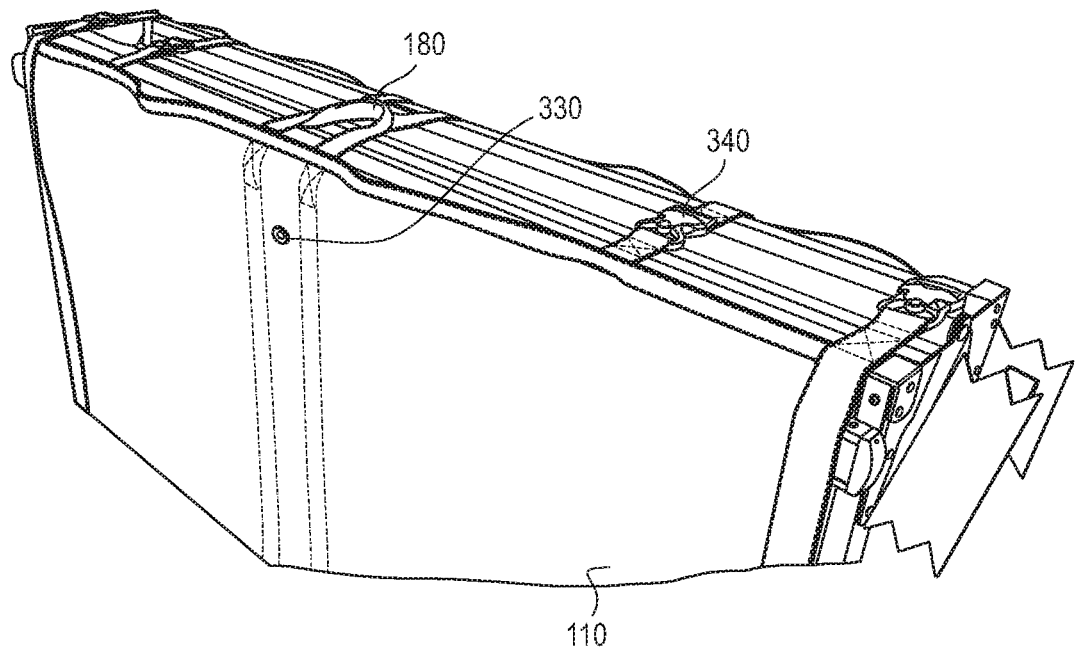
FIG. 11 shows an exemplary ground blind stand from a first view according to an embodiment of the present disclosure.
Figure 12:
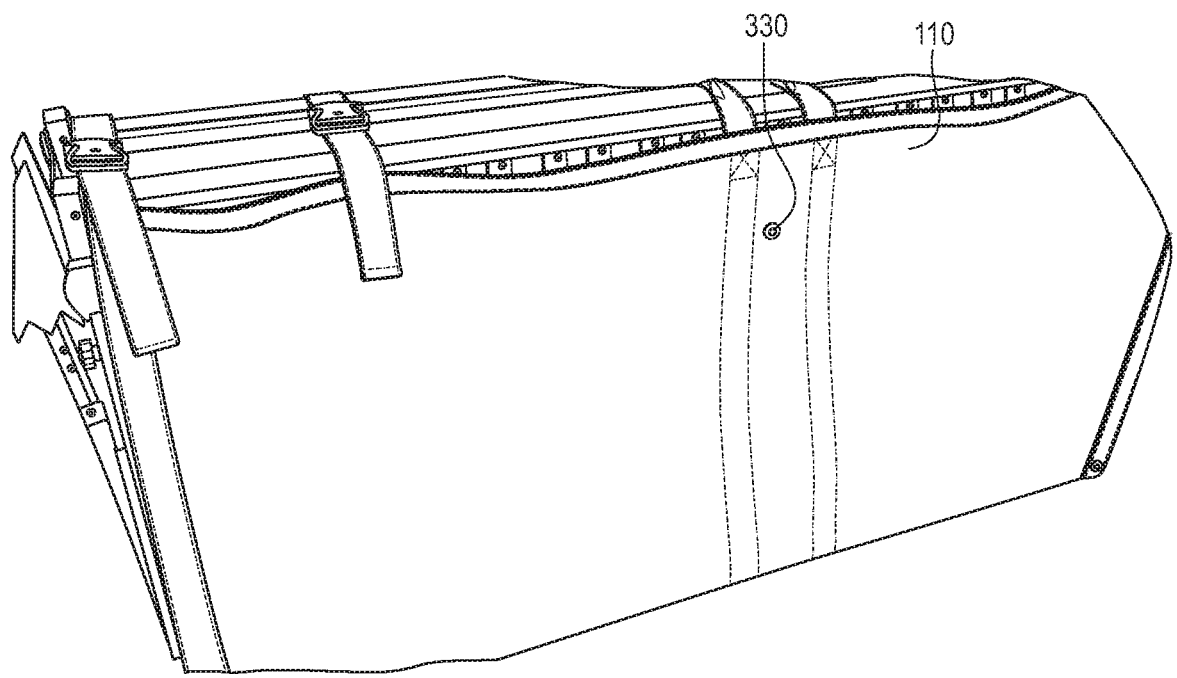
FIG. 12 shows an exemplary ground blind stand from a second view according to an embodiment of the present disclosure.

FIGS. 11 and 12 show an exemplary ground blind stand 100 from different perspectives in which that the ground blind stand 100 is folded up and stored in its carrying folding floor case 110 according to the present disclosure. Referring to FIGS. 11 and 12, the ground blind stand 100 is folded in half and portions of the ground blind stand 100 are disassembled and stored in the folding floor case 110. The assembly of the ground blind stand 100 with the folding floor case 110 secured to the blind base 120 can be achieved without the use of any additional tools or can be a toolless assembly according to some embodiments of the present disclosure. The folding floor case 110 can be made of a tarp or a cover, which when placed over the blind base 120 during assembly, deadens sound of anything resting or moving on top of the folding floor case 110 such as a chair, for example. The folding floor case 110 is also shown with a grommet 330 that can be used to secure the folding floor case 110 to the blind base 120 during assembly. A grommet 330 can be found, for example, on at least each of the four sides of the folding floor case 110 to secure each side of the folding floor case 110 to the blind base 120. Buckles 340 secure the folding floor case 110 to hold the ground blind stand 100 and carrying straps 180 assist with the carrying of the folding floor case 110.

Figure 9:
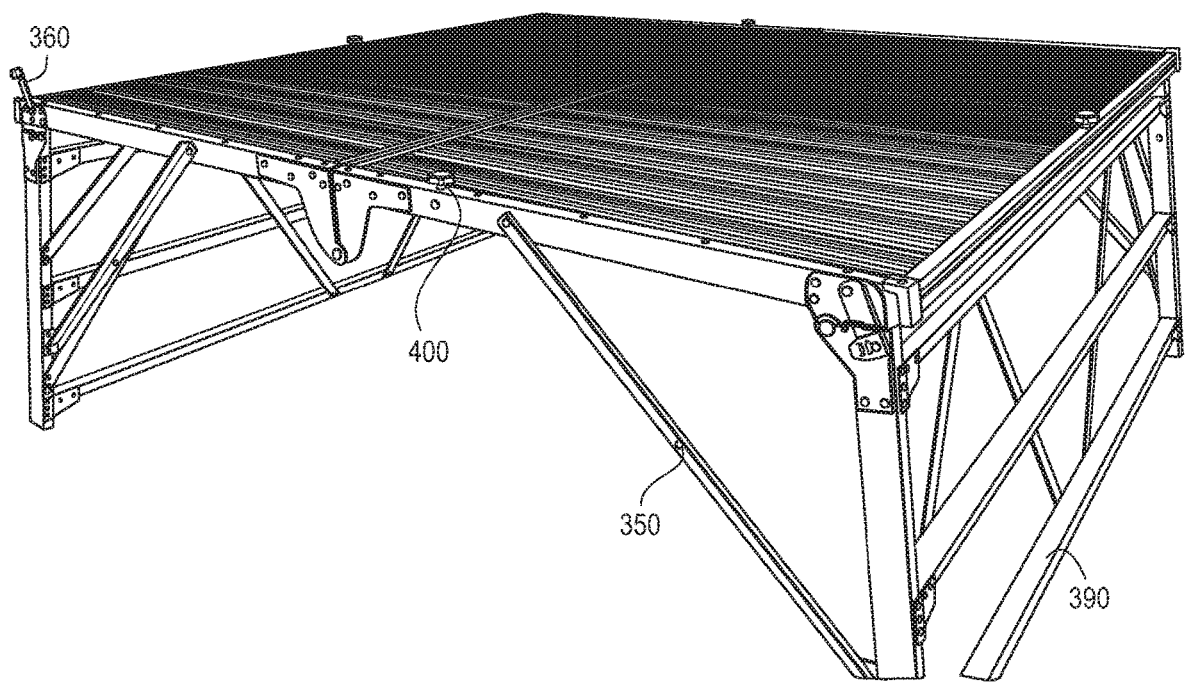
FIG. 9 shows an exemplary ground blind stand according to an embodiment of the present disclosure.
Figure 10:
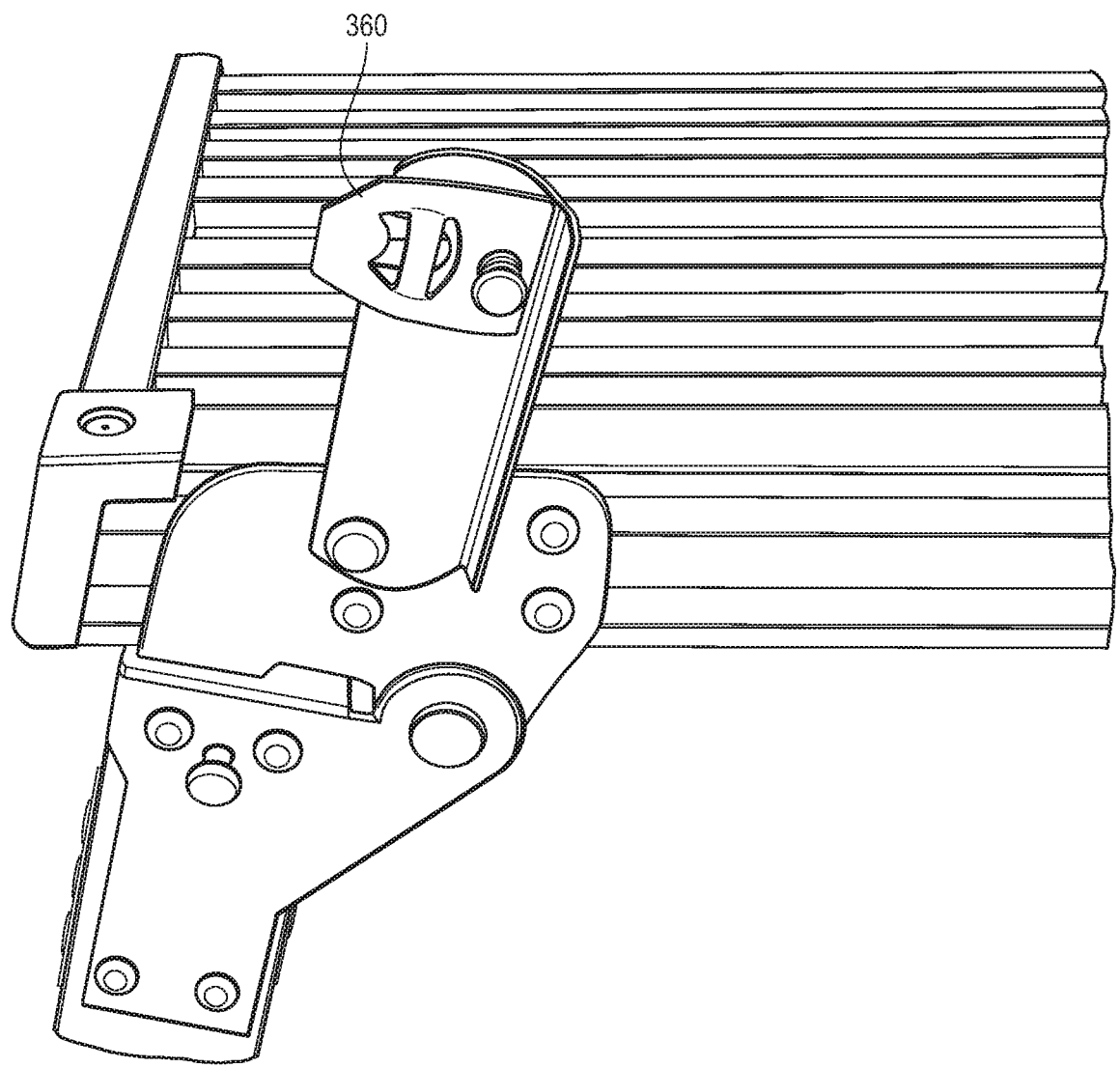
FIG. 10 shows an exemplary latch according to an embodiment of the present disclosure.

FIG. 9 shows an assembled exemplary ground blind stand 100 without the folding floor case 110 according to an embodiment of the present disclosure. In some embodiments, the assembly is toolless and may be performed by just one person. For example, the legs 130 can be straightened out, unfolded, and/or inserted into place and locked in by brackets 350 and/or latches 360 or other locking mechanisms. FIG. 10 shows an exemplary latch 360 (e.g., an adjustment lever) that can be used to secure a leg 130 according to an embodiment of the present disclosure. In some embodiments, a ladder 390 can be formed between the legs 130 to provide steps by which to access the blind base 120 or platform.

Figure 13:
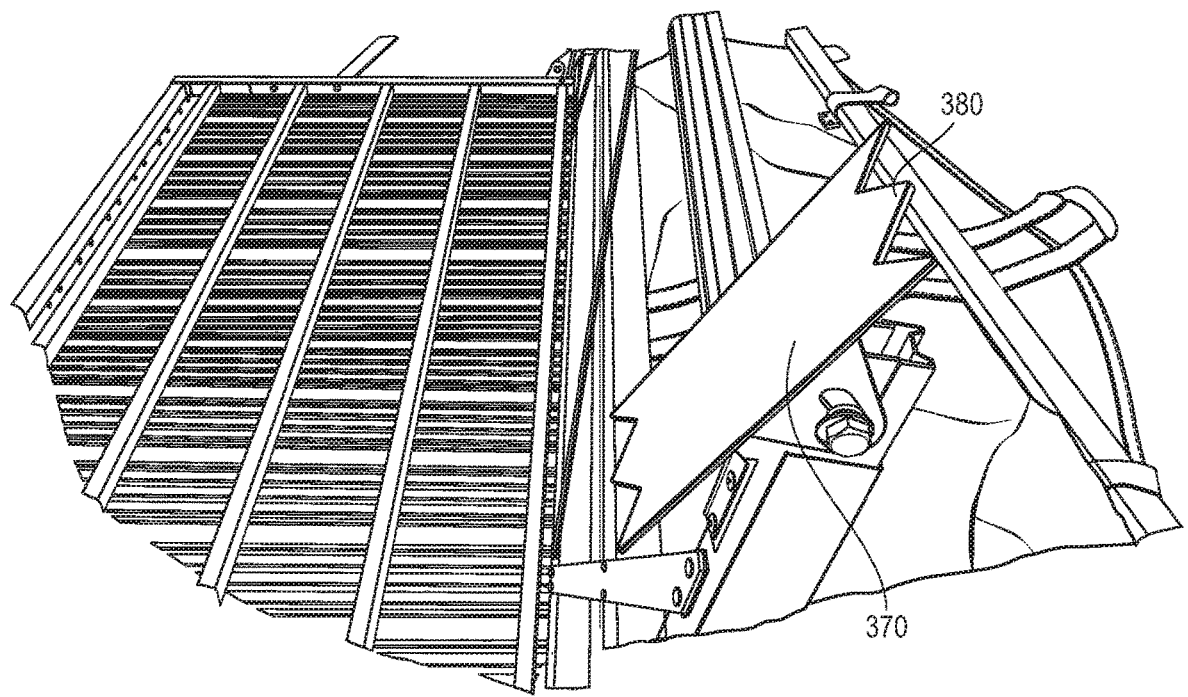
FIG. 13 shows an exemplary foot of an exemplary leg according to an embodiment of the present disclosure.

FIG. 13 shows an exemplary foot 370 at the end of a leg 130 according to an embodiment of the present disclosure. The foot 370 can be set flat on the ground or set at an angle to the ground so that the teeth 380 of the foot 370 dig into the ground. This would be advantageous, for example, on a sloped and/or slippery surface. Further, the legs 130 are individually or independently adjustable in height so that the platform can be level. In some embodiments, the legs 130 can have the foot 370, the foot 370 with teeth 380, and/or a foldable and/or removable ground stake 280.

Figure 14:
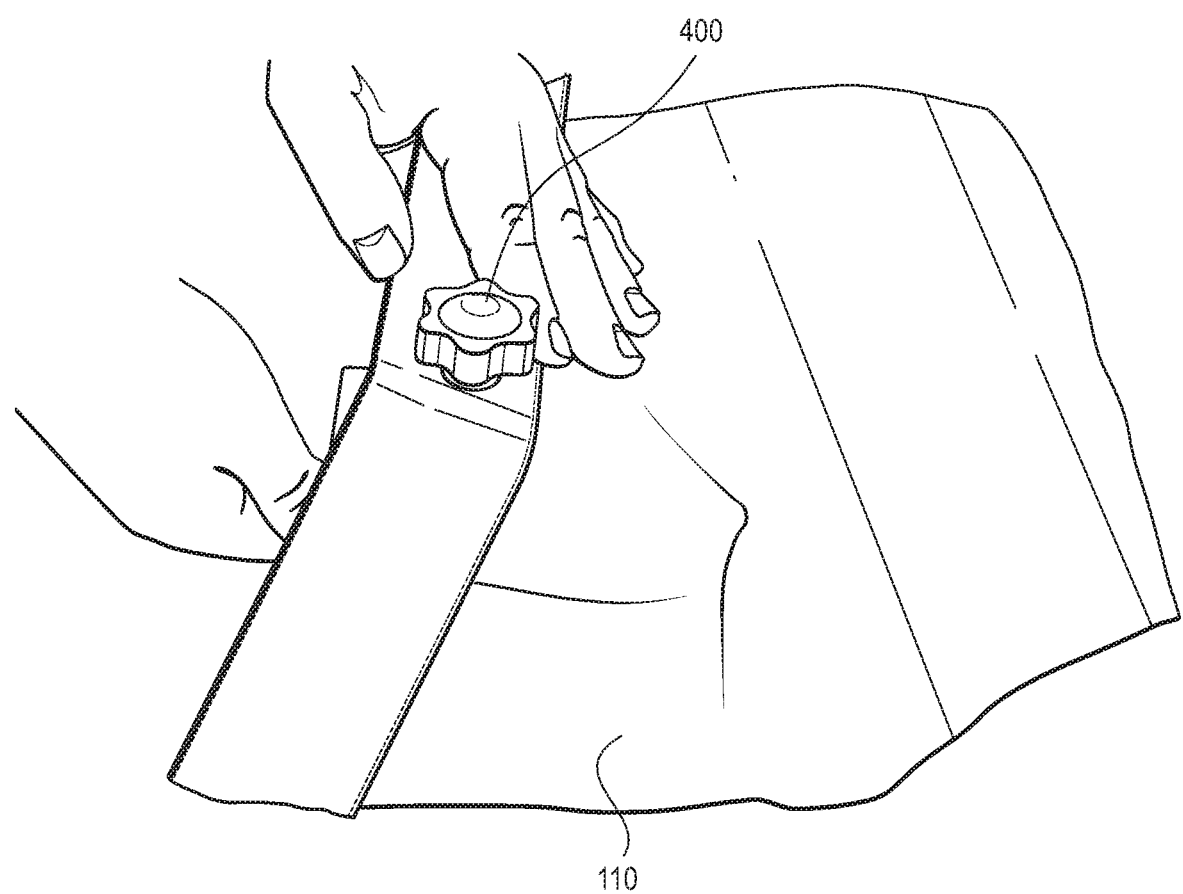
FIG. 14 shows a folding floor case being attached to a ground blind stand according to an embodiment of the present disclosure.
Figure 15:
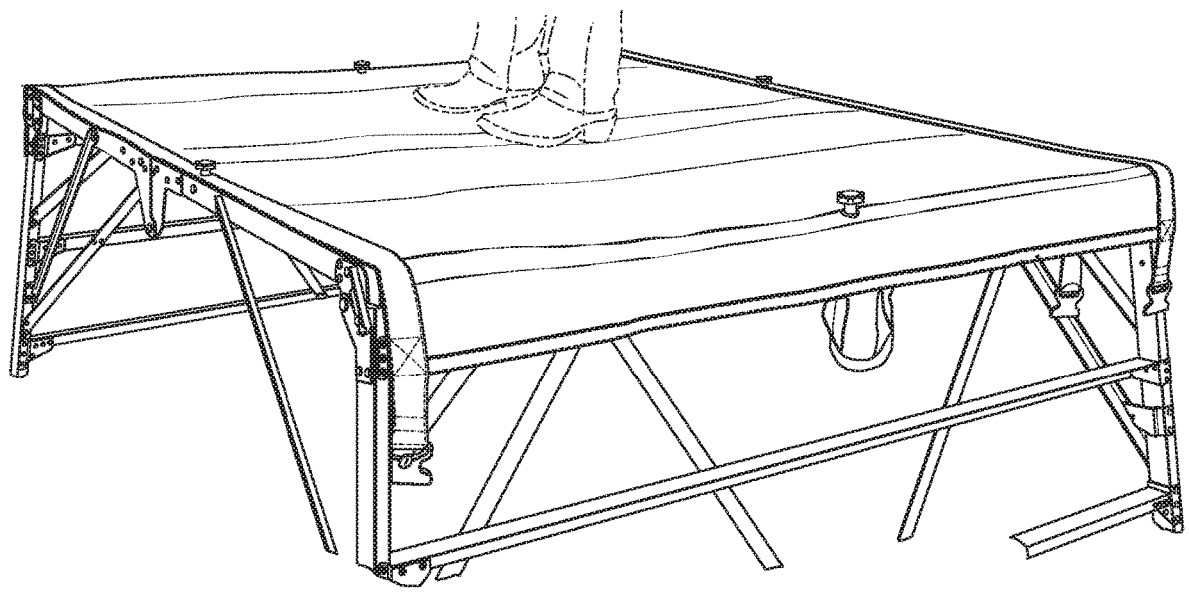
FIG. 15 shows an exemplary ground blind stand with an exemplary folding floor case attached to the exemplary ground blind stand according to an embodiment of the present disclosure.

FIGS. 14 and 15 show the attachment of the folding floor case 110 to the rest of the ground blind stand 100 according to an embodiment of the present disclosure. A screw 400 that is held and/or received by the blind base 120 (see, e.g., FIG. 9) can be used to secure the folding floor case 110 to the blind base 120 through the grommet 330 of the folding floor case 110 as shown in FIG. 14. In some embodiments, the grommet 330 secures the folding floor case 110 to the blind base 120, the ground blind 140 to the ground blind stand 100, and/or the ground blind stand 100 to the ground. In some embodiments, the grommet 330 secures the folding floor case 110 to the blind base 120, the ground blind 140 to the folding floor case 110, and/or the folding floor case 110 to the ground. FIG. 15 shows the folding floor case 110 attached to the blind base 120 by at least four screws 400. In some embodiments, when the folding floor case 110 is attached to the blind base 120, the ground blind stand 110 can be folded up for storage and re-opened. In some embodiments, the folding floor case 110 is removed from the blind base 120 before folding up the ground blind stand 110 for storage, and attached again during assembly.

Some embodiments provide for the unpacking and setting up of the portable ground blind stand without the need for tools. The various components of the portable ground blind stand are lightweight and sturdy and are carried to a ground blind location in a case (e.g., the folding floor case) with straps. The various components of the portable ground blind stand are taken out of the case (e.g., the folding floor case) and assembled without the need of tools in a few minutes. The case is used as a floor for the portable ground blind stand. Some embodiments provide for the unpacking and setting up of the portable ground blind stand and ground blind without the need for tools in a few minutes.

Some embodiments provide that the folding floor case serves as the floor or platform and/or a floor cover for the portable ground blind stand. Some embodiments provide that the portable ground blind has its own blind base that can be removable or permanently integrated with the portable ground blind. In some embodiments, the folding floor case can serve as a floor cover for the portable ground blind stand that has a blind base.

Although tools are not used in assembling the portable ground blind stand and/or the ground blind, tool use is also within the scope of the present disclosure.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

The invention claimed is:

1. A portable ground blind stand, comprising:
a case that is configured to carry other components of the portable ground blind stand when the portable ground blind is being stored or carried and that is configured as a floor or floor covering attached to a stand platform when the portable ground blind is assembled; and
the stand platform configured to receive one or more leg arrangements, wherein the one or more leg arrangements are secured to the stand platform, and wherein the secured one or more leg arrangements are folded in the case for carrying and unfolded from the case during assembly of the portable ground blind stand.

2. The portable ground blind stand according to claim 1, wherein each leg arrangement comprises an inner leg and an outer leg, and the inner leg slides inside the outer leg.

3. The portable ground blind stand according to claim 2, wherein the inner leg and the outer leg are secured by a pin, a latch, or an adjustment lever to set a particular length or height.

4. The portable ground blind stand according to claim 3, wherein at least one leg arrangement can be adjusted to a different length independently from the other leg arrangements to level the stand platform.

5. The portable ground blind stand according to claim 1, wherein at least one leg arrangement comprises a spike to secure the at least one leg arrangement to a surface.

6. The portable ground blind stand according to claim 5, wherein the spike is foldable into the at least one leg arrangement for storage or transportation.

7. The portable ground blind stand according to claim 1, wherein the case comprises a foldable floor for the portable ground blind stand, and wherein the case is waterproof and provides drain holes.

8. The portable ground blind stand according to claim 1, wherein the case comprises a first section and a second section connected by a hinge, wherein the hinge is wide enough so that, when the first section and the second section are folded, the other components of the portable ground blind stand fit between the first section and the second section.

9. The portable ground blind stand according to claim 1, wherein the portable ground blind stand is stored and carried in the case.

10. The portable ground blind stand according to claim 1, wherein the case is separate from the stand platform, wherein the case provides the floor covering on top of the stand platform.

11. The portable ground blind stand according to claim 9, wherein the case includes one or more straps for carrying the stored portable ground blind stand by hand.

12. The portable ground blind stand according to claim 1, wherein the stand platform is collapsible for storage in the case.

13. The portable ground blind stand according to claim 1, wherein the stand platform comprises a frame and one or more cross braces, and wherein the one or more cross braces are removably inserted into the frame to provide support.

14. The portable ground blind stand according to claim 1, wherein the stand platform comprises a frame and one or more cross braces, and wherein the one or more cross braces are fixed into or structurally integral with the frame to provide support.

15. The portable ground blind stand according to claim 1, wherein the portable ground blind can be assembled without tools.

16. The portable ground blind stand according to claim 1, wherein the case includes at least one grommet that is used to secure the case to the stand platform.

17. The portable ground blind stand according to claim 1, wherein the at least one grommet is used to secure the case to the stand platform, a blind to the case, and the case to a ground.

18. The portable ground blind stand according to claim 1, wherein at least one leg arrangement comprises a flat foot that can be configured at different angles with respect to the leg arrangement.

19. The portable ground blind stand according to claim 18, wherein the flat foot comprises teeth that can be angled into a ground.

20. The portable ground blind stand according to claim 1, wherein at least two leg arrangements are used to form a ladder to access the stand platform.

* * * * *